March 25, 1958  N. C. MORRISON  2,828,022
EAVES TROUGH STRAINER
Filed Nov. 15, 1954
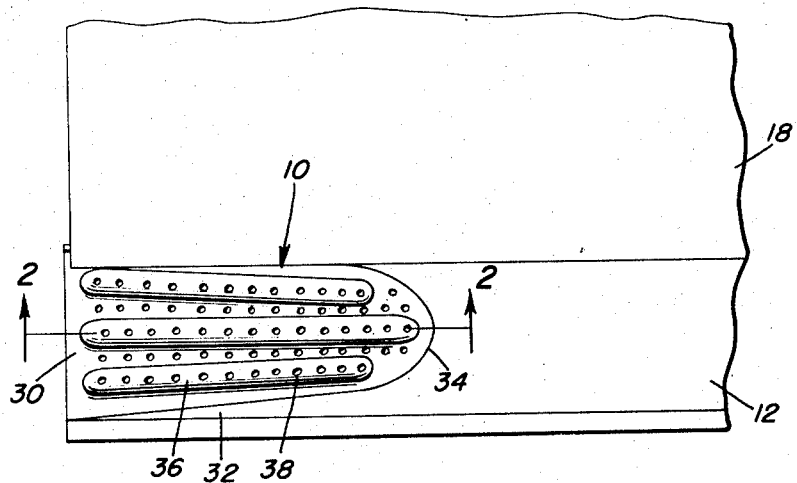
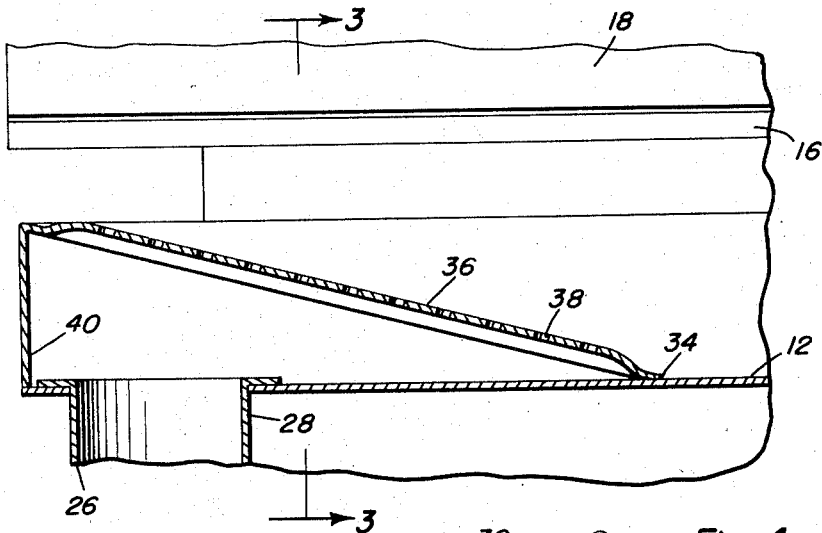
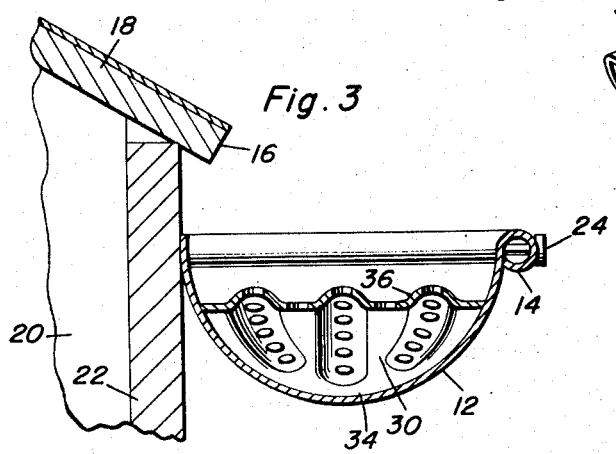
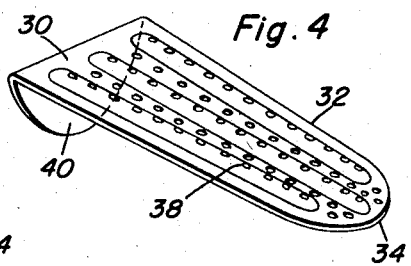
Noah C. Morrison
INVENTOR.

United States Patent Office 2,828,022
Patented Mar. 25, 1958

2,828,022

EAVES TROUGH STRAINER

Noah C. Morrison, Claypool, Ind.

Application November 15, 1954, Serial No. 468,605

1 Claim. (Cl. 210—459)

This invention generally relates to an eaves trough strainer and more specifically provides a self-cleaning type of eaves trough strainer adapted to be positioned in overlying relation to the downspout communicating with the eaves trough thereby preventing the choking or clogging of the downspout or downpipe and simultaneously disposing of the foreign matter which may fall in the eaves trough for retaining the eaves trough in a clean condition to permit easy flow of rain water therefrom.

Another object of the present invention is to provide an eaves trough strainer which may be easily inserted and secured in an eaves trough, rugged in construction, well adapted for its intended purposes, self-cleaning, and relatively inexpensive to manufacture.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1 is a plan view of the eaves trough strainer of the present invention positioned in an eaves trough in operative position;

Figure 2 is a longitudinal, vertical sectional view taken substantially upon a plane passing along section line 2—2 of Figure 1 illustrating the relationship of the eaves trough strainer to the eaves trough and the downspout attached thereto;

Figure 3 is a transverse, vertical sectional view taken substantially upon a plane passing along section line 3—3 of Figure 2, illustrating the transverse construction of the strainer; and Figure 4 is a perspective view of the eaves trough strainer per se.

Referring now specifically to the drawings, the numeral 10 generally designates the eaves trough strainer for positioning in an eaves trough or gutter trough 12 having a rolled outer edge 14 and being generally U-shaped in transverse cross-section. The eaves trough 12 is supported slightly below and slightly inwardly of the eaves 16 of the roof 18 of a building 20 having a side wall 22. The eaves trough 12 may be secured to the building wall 22 by elongated fastening members 24 or any other suitable supporting means wherein the supporting means does not form a particular portion of the present invention. As will be understood, the eaves trough 12 is provided with a certain amount of elevational change wherein a depending downspout or drainpipe 26 is inserted into an opening 28 at the lowermost part in the eaves trough 12 adjacent one end thereof and generally adjacent the corner of the building 20.

In order to prevent the entrance of foreign matter such as leaves or the like into the drain pipe 26, the eaves trough strainer 10 of the present invention is provided and generally includes an elongated flat plate 30 having converging side edges 32 which terminate in a rounded end portion 34. Disposed longitudinally in the plate 30 and generally being inclined similarly to the edges 32 is a series of longitudinal bulges or raised portions 36 which project upwardly from the plate 30. The plate 30 is provided with a plurality of apertures 38 arranged throughout the entire surface thereof to permit passage of water therethrough. The end of the plate 30 remote from the rounded end 34 is provided with an integral depending semi-circular end portion 40 which generally conforms to the inner surface of the eaves trough 12.

In installation, the eaves trough strainer is positioned in overlying relation to the opening 28 and the downspout or drainpipe 26 with the plate 40 engaging the inner surface of the eaves trough 12 on one side of the opening 28 and the converging edges 32 and the rounded end 34 engaging the eaves trough 12 along the inner surface thereof and contacting the bottom of the eaves trough 12 on the other side of the opening 28 from the end portion 40 of the plate 30.

When water carries foreign objects or matter down the eaves trough 12, the inclined plate 30 will cause the leaves or foreign matter to move upwardly along the same and at the same time to permit the water to pass downwardly through the opening 38 into the downspout 26. The foreign matter will be carried upwardly over the upper edge of the end portion 40 of the plate 30 and thence outwardly from the end of the eaves trough 12 thereby disposing of such matter and eliminating clogging of the downspout thereby. The positioning of the end plate 40 may be varied as desired and the end plate 40 may be employed as the end of the eaves trough if desired. The entire device may be constructed of any suitable material which is corrosive resistant and having the usual qualities employed in eaves trough construction.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

An eaves trough strainer comprising an elongated plate member having a rounded end and diverging side edges, said plate member being disposed in inclined relation adjacent the end of an eaves trough with the rounded end and side edges generally contacting the inner surface thereof, a depending end plate on the other end of said plate member, said end plate having a terminal edge generally conforming to the inner surface of the eaves trough for vertical disposition therein, said inclined plate member having a plurality of apertures therein and overlying a downspout opening whereby water may drain through the openings and foreign matter will ride up the inclined plate member and be discharged from the other end thereof for discharge from the end of the eaves trough, said inclined plate member having a plurality of raised longitudinal ribs forming a support for foreign material and reducing frictional contact between the foreign material and the inclined plate member for facilitating the discharge of foreign material from the trough.

References Cited in the file of this patent

UNITED STATES PATENTS

| | | |
|---|---|---|
| 520,993 | Keller | June 5, 1894 |
| 608,844 | Dick | Aug. 9, 1898 |
| 674,993 | Young | May 28, 1901 |
| 1,290,470 | Yordy | Jan. 7, 1919 |
| 1,551,599 | Wright | Sept. 1, 1925 |
| 2,721,660 | Woodrow | Oct. 25, 1955 |

FOREIGN PATENTS

| | | |
|---|---|---|
| 2,701 | Great Britain | 1911 |